DIGITAL DIFFERENTIATOR FOR AMPLITUDE MODULATED CARRIER

Filed Nov. 30, 1962 2 Sheets-Sheet 1

INVENTORS
HERBERT L. PETERSON
WILLIAM J. FINNEY
BY John C. Holford Agent
Richard C. Reed
ATTORNEY Sept. 20, 1966 H. L. PETERSON ET AL 3,274,503

DIGITAL DIFFERENTIATOR FOR AMPLITUDE MODULATED CARRIER

Filed Nov. 30, 1962 2 Sheets-Sheet 2

INVENTORS
HERBERT L. PETERSON
WILLIAM J. FINNEY
BY John E. Holford Agent
Richard C. Reed
ATTORNEY 3,274,503
Patented Sept. 20, 1966

3,274,503

DIGITAL DIFFERENTIATOR FOR AMPLITUDE MODULATED CARRIER

Herbert L. Peterson, 5521 24th Ave., Hillcrest Heights, Md., and William J. Finney, Lakeside Terrace, Rte. 1, Box 570, Accokeek, Md.

Filed Nov. 30, 1962, Ser. No. 241,450
3 Claims. (Cl. 329—104)

The invention described herein may be manufactured and used by or for the Government of the United States of America for governmental purposes without the payment of any royalties thereon or therefor.

The present invention is directed to a receiver or detector for use in a carrier wave communication system.

In the better known systems of communication using carrier waves, the information is also of such a redundant nature that gross errors are easily corrected by taking average values of the information received. A simple audio detector for home radios, for example, stores successive cycles of the carrier in an electrical reservoir and the information is obtained by observing changes in the level of the reservoir over a large number of cycles.

In telemetering systems critical variations often occur in a very few cycles or even two successive cycles of the carrier and are not repeated. It is necessary in such systems, therefore, that the carrier be examined on a cycle to cycle basis with extreme accuracy. Also, since analog data tends to be distorted with processing, it is imperative that the data be converted to digital form with as little handling as possible.

An object of the present invention is, therefore, to provide a carrier wave detector which converts analog data impressed thereon directly to digital form preserving the amplitude, frequency and phase characteristics for subsequent computation or analysis.

Another object of the invention is to provide a carrier wave detector which divides the wave into a large number of samples on a time basis and converts to digital form only those samples representative of the peak amplitudes of the carrier.

Figures 1A, 1B, 1C, 1D, 1E:
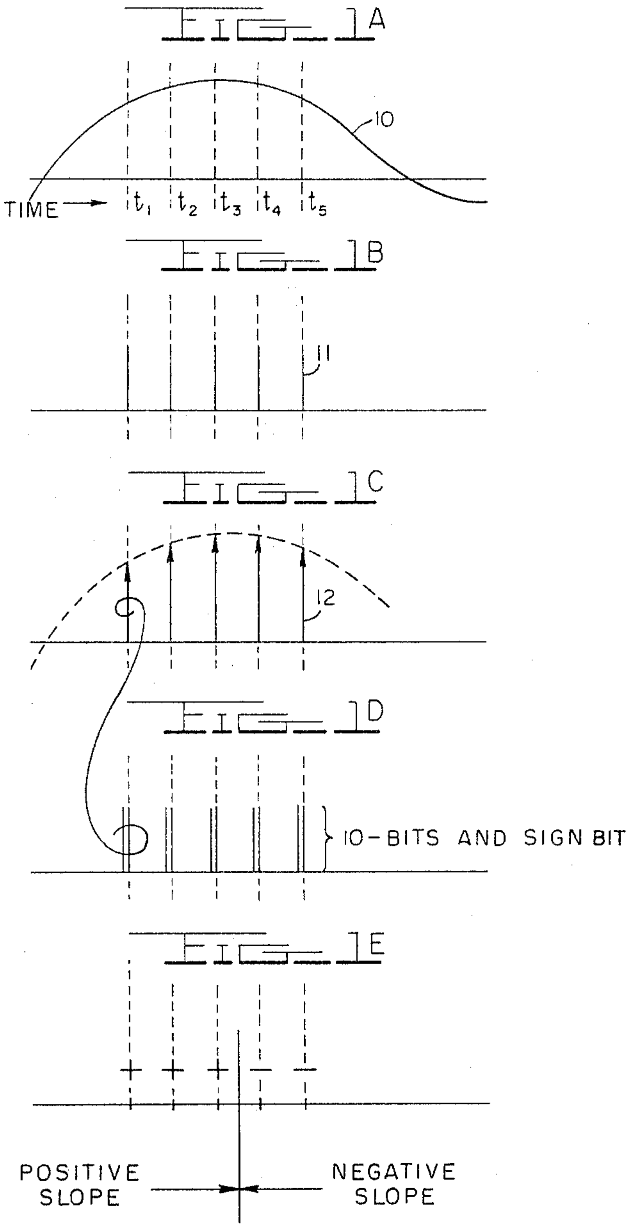
Figure 2:
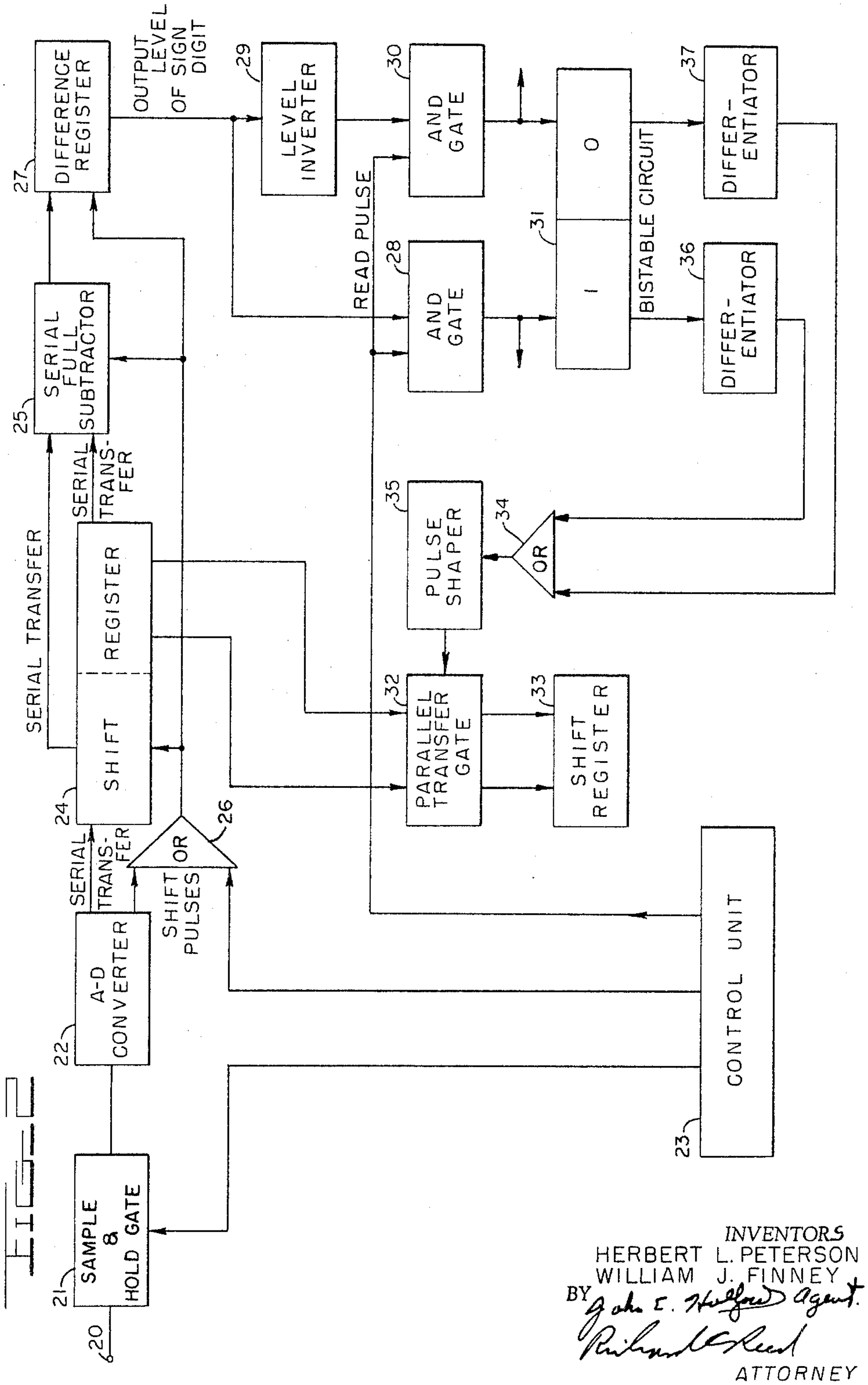

These and other objects or attendant advantages of the present invention are best understood with reference to the following specification taken with the accompanying drawings, wherein:

FIGS. 1A–1E show graphs in time of the various forms of information present in the detector of the present invention; and FIG. 2 shows in block diagram form a typical embodiment of the invention.

Referring particularly to FIGS. 1A–1E, the sequence of mathematical operation performed by the present invention may be seen. The first of these figures shows a portion of carrier wave 10 including a complete half cycle of amplitude variation. The carrier may vary from cycle to cycle due to phase, frequency or amplitude modulation and may include more than one of these. In order to properly evaluate the information present in the carrier, samples are taken at regular intervals $t_1$, $t_2$, . . . $t_5$ as requested by the dashed vertical lines. To obtain these samples a series of narrow gating pulses 11 as shown in FIG. 1B are required. When the signal is gated by these pulses a series of narrow pulses 12 of varying amplitude, as shown in FIG. 1D are obtained.

The remaining operations are performed in digital form. Each of the samples is converted to binary code words of suitable accuracy, as for example, the 10 bits and sign indicated in FIG. 1D. Subtracting each word from the one which follows it provides a new set of difference words. Observing only the sign of these words as indicated in FIG. 1E, this digit is seen to change as the peak value of wave passes.

FIG. 2 shows a block diagram of the circuit which performs the above operations and utilizes them to extract information modulated on the carrier wave. The various parts of the circuit to be described may in themselves be rather complex, but each has come to be a stock item to those skilled in the computer art. These parts are generally obtainable in more than one form, as for example, electromechanical, vacuum tube, transistorized or those employing tunnel diodes. The choice of any particular form will depend on the service conditions and economic considerations.

Operation of the circuit is as follows: The carrier under investigation is applied to the input 20 of a sample and hold gate 21. Such a gate is described in detail in Patent No. 2,955,203, issued October 4, 1960 to William J. Finney and Herbert L. Peterson. However, any other suitable sampling means may be employed in place of sample-and-hold gate 21. The function of sample-and-hold gate 21 is to convert the continuously varying carrier or analog signal to a series of step functions of equal duration and and having amplitudes corresponding to the instantaneous amplitude of the analog signal. Such a signal is ideally suited for use with analog to digital converters to which the gate 21 is connected.

The operation of the sample and hold gate and subsequent parts of the circuit are controlled by a control unit 23. Basically this unit consists of a clock controlled pulse generator, which supplies output pulses to control events occurring both at digital rates and those which occur at the word rate. Pulses at the latter rate are applied to the gate 21.

The analog-to-digital converter 22 changes the step function from sampling gate 21 to a serial pulse or binary code. As soon as all of the bits or digits of the code are generated they are transferred in ascending order of significance to a shift register 24. Before each subsequent pulse or digit is transferred, the converter 22 emits a shift pulse to advance the shift register. Various types of code pulses may be obtained depending on the type converter used. In one of the better arrangements the digit is indicated by the reversible polarity between a pair of output terminals. This type of signal provides a more efficient switching action in the Eccles-Jordan circuits found in most shift registers, since the circuit is urged into a predetermined state which it may or may not be in.

The shift register 24 is long enough to hold at least one word and an additional digit of a subsequent word as indicated by the dashed line running through the center. The outputs from the register places containing the above digits are fed to a serial subtractor 25. To insure that sequence of digits is not lost due to omission of a shift pulse from the converter, these pulses are applied throughout one input of an "OR" gate 26. The remaining input of gate 26 is supplied from the control unit with a duplicate set of pulses.

Also to insure synchronization these shift pulses may be applied to the full subtractor and a difference shift register 27 connected to the output of the subtractor, if desired. The difference between successive samples thus builds up in register 27 for further processing.

The next portion of the circuit is employed to select the peak sample. An output is taken from the place in the register containing the most significant or sign digit. Generally there will be two output terminals of opposite polarity available at this place and these will be connected to the direct inputs of AND gates 28 and 30. Where only one such level is available, it can be applied to both AND gates provided one AND gate has a level inverter 29 interposed in its input. Such inverters are often used to drive push-pull amplifiers from single-ended amplifiers and are quite well known.

The AND gates are operated by pulses applied from the control unit to their enabling inputs. The output of each gate is connected to symmetrically opposite control terminals of an Eccles-Jordan or similar form of bistable circuit 31. The control unit supplies pulses at the end of each word. If the sign digit changes between words the voltages applied through the AND gate will trip the bistable circuit.

The above condition indicates that the desired value is stored in the shift register 24. To remove this information a parallel transfer gate 32 is gated "on" to transfer the word to a storage shift register 33, a magnetic drum recorder or other similar utilization device.

The bistable circuit 31 supplies the trigger pulse to the transfer gate. The square wave pulses from two oppositely polarized high signal level points in the bistable circuit (e.g., plates or collectors where vacuum tubes or transistors are used) are passed through separate differentiators 36 and 37 and applied to the inputs of a diode OR gate 34. Only the pulse of appropriate polarity passes the OR gate 34 (thus preventing cancellation of the two) to drive the pulse shaper 35. The pulse shaper generates a pulse of the proper shape and power to operate the transfer gate.

In some instances the register 33 will be a recorder operated on a suitable time base, so that the interval between samples becomes a part of the record, and it is possible to reconstruct the carrier to obtain information on phase and frequency. If the sampling event triggers the recorder it is desirable to supply signals from a separate clock to be recorded with each sample. The clock may be reset to zero by each sampling event, or may run continuously to provide even greater accuracy. This clock may be part of the control unit.

Numerous variations may be made in the various parts of the circuit. The literature abounds with descriptions of various forms of shift registers, subtractors, analog-to-digital converters and the like. One example of this literature is the publication by Scott, Analogue and Digital Computer Technology, published by McGraw-Hill, 1960. Instead of the serial transfer devices shown the invention may be implemented with parallel transfer devices, although these tend to be more complex.

Obviously many modifications and variations of the present invention are possible in the light of the above teachings. It is therefore to be understood that within the scope of the appended claims the invention may be practiced otherwise than as specifically described.

What is claimed is:

1. A detector for modulated carrier waves comprising:
   - sampling means for sampling the amplitude of the carrier at a rate greater than the frequency of said carrier,
   - analog-to-digital converter means coupled to said sampling means for converting samples from said sampling means to digital form,
   - first storage means operatively coupled to said analog-to-digital converter for storing at least one of said samples and a subsequent sample,
   - subtractor means coupled to the output of said storage means for extracting a difference sample equal to the difference between two successive samples,
   - second storage means for storing at least one of said samples,
   - gating means for coupling said first storage means to said second storage means, and
   - circuit means operatively coupled between said subtractor means and said gating means for opening said gating means when the sign of said difference sample changes to transfer the sample from said first storage means to said second storage means.

2. A detector as set forth in claim 1 wherein said first storage means comprises a shift register.

3. A detector as set forth in claim 1 further including control means for providing time samples of the interval between samples, said control means being coupled to said first storage means to store said time samples with the subsequent amplitude sample.

References Cited by the Examiner

UNITED STATES PATENTS 3,146,424 8/1964 Peterson et al.

ROY LAKE, *Primary Examiner.*

A. L. BRODY, *Assistant Examiner.*